US005735230A

United States Patent [19]

Romesburg

[11] Patent Number: 5,735,230

[45] Date of Patent: Apr. 7, 1998

[54] APPARATUS FOR SUPPORTING FLAGS ON AUTOMOBILE ANTENNAS

[76] Inventor: Daniel R. Romesburg, 1816 Rebecca Rd., Lutz, Fla. 33549

[21] Appl. No.: 711,169

[22] Filed: Sep. 6, 1996

[51] Int. Cl.$^6$ .............................. G09F 17/00; B60Q 1/26

[52] U.S. Cl. .............................. 116/173; 116/28 R; 116/209

[58] Field of Search .............................. 116/28 R, 173, 116/174, 175, 209; 40/591, 592, 658, 660, 666

[56] References Cited

U.S. PATENT DOCUMENTS

| | | | |
|---|---|---|---|
| 973,731 | 10/1910 | Watkins | 40/658 |
| 2,906,234 | 9/1959 | Scott | 116/173 |
| 3,009,437 | 11/1961 | Hollinger et al. | 116/209 |
| 3,127,869 | 4/1964 | Howland | 116/173 |
| 3,217,690 | 11/1965 | Mihalisin | 116/173 |
| 3,797,151 | 3/1974 | Dexter | 40/592 |
| 4,292,749 | 10/1981 | Thomas | 40/308 |
| 5,299,525 | 4/1994 | Romesberg | 116/173 |

*Primary Examiner*—William A. Cuchlinski, Jr.
*Assistant Examiner*—Willie Morris Worth

[57] ABSTRACT

An apparatus for supporting flags on automobile antennas including an antenna securement portion adapted for securement to an antenna of an automobile. A flag attachment portion is molded with the antenna securement portion. A flag is removably received within the flag attachment portion.

8 Claims, 3 Drawing Sheets

FIG 3
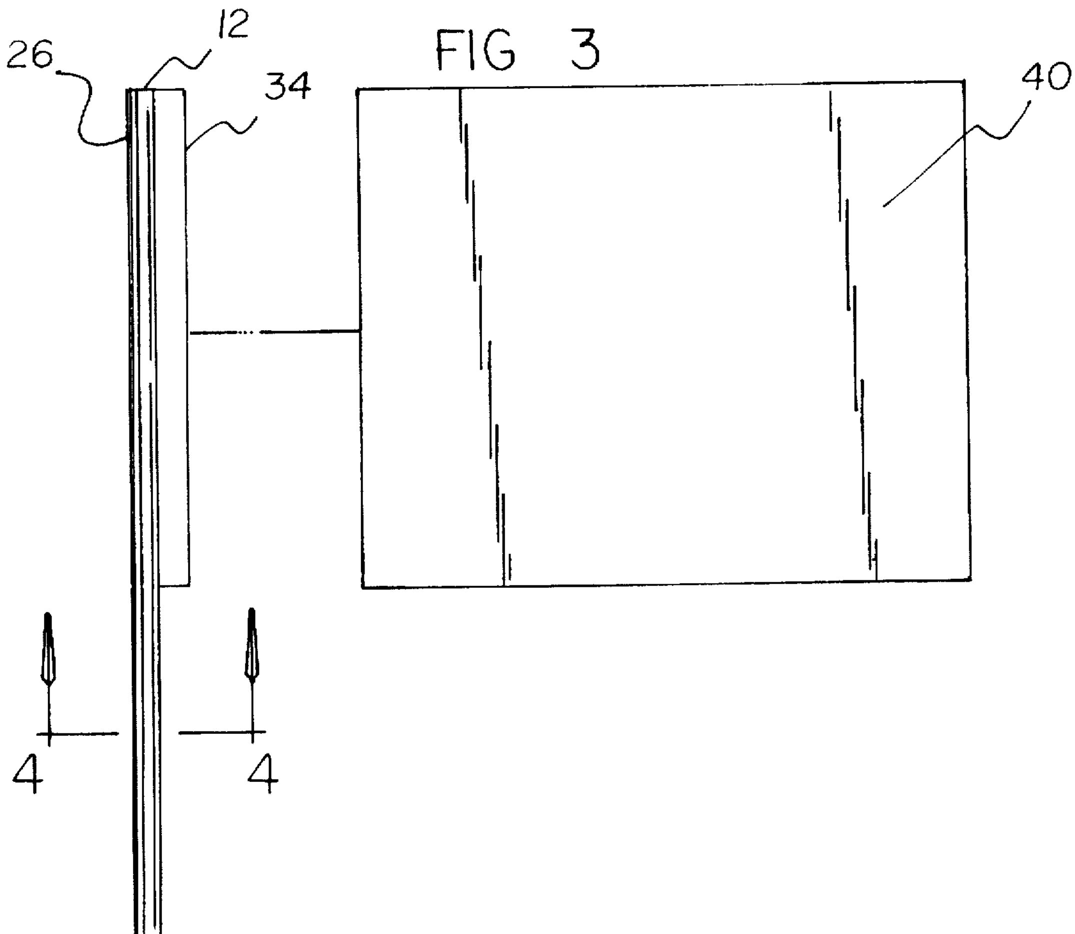
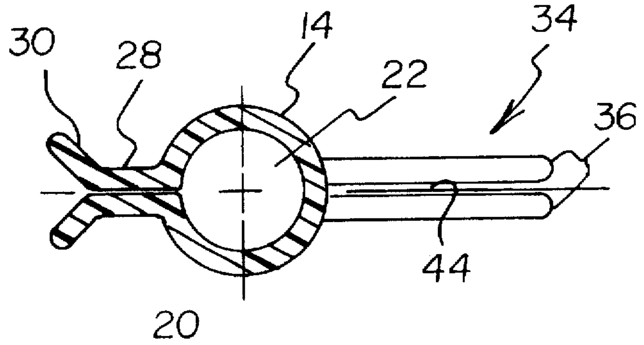
FIG 4

APPARATUS FOR SUPPORTING FLAGS ON AUTOMOBILE ANTENNAS

BACKGROUND OF THE INVENTION

1. Field of the Invention

The present invention relates to an apparatus for supporting flags on automobile antennas and more particularly pertains to removably positioning flags over antennas of automobiles with an apparatus for supporting flags on automobile antennas.

2. Description of the Prior Art

The use of devices for supporting flags is known in the prior art. More specifically, devices for supporting flags heretofore devised and utilized for the purpose of supporting flags are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,601,255 to Marcotti discloses flags releasably supported on upstanding rods such as vehicle antennas.

U.S. Pat. No. 4,875,431 to Dobosz discloses flags releasably supported on upstanding rods such as vehicle antennas.

U.S. Pat. No. 4,519,153 to Moon discloses flags and supports removably mountable with respect to automobiles.

U.S. Pat. No. 4,650,147 to Griffin discloses flags and supports removably mountable with respect to automobiles.

U.S. Pat. No. 3,712,263 to Faragosa discloses a complex support which is large and expensive and which has no provision for flag replacement.

U.S. Pat. No. 4,964,360 to Henry discloses a complex mechanism for attachment to an antenna with no flag or flag attachment structures used in association therewith.

U.S. Pat. No. 4,989,563 to Liming discloses a structure attachable over the upper end of an antenna requiring parts of complex shapes which add to the cost and there is no flag or flag attachment structures used in association therewith.

While these devices fulfill their respective, particular objective and requirements, the aforementioned patents do not describe an apparatus for supporting flags on automobile antennas for removably positioning flags over antennas of automobiles.

In this respect, the apparatus for supporting flags on automobile antennas according to the present invention substantially departs from the conventional concepts and designs of the prior art, and in doing so provides an apparatus primarily developed for the purpose of removably positioning flags over antennas of automobiles.

Therefore, it can be appreciated that there exists a continuing need for new and improved apparatus for supporting flags on automobile antennas which can be used for removably positioning flags over antennas of automobiles. In this regard, the present invention substantially fulfills this need.

SUMMARY OF THE INVENTION

In the view of the foregoing disadvantages inherent in the known types of devices for supporting flags now present in the prior art, the present invention provides an improved apparatus for supporting flags on automobile antennas. As such, the general purpose of the present invention, which will be described subsequently in greater detail, is to provide a new and improved apparatus for supporting flags on automobile antennas and method which has all the advantages of the prior art and none of the disadvantages.

To attain this, the present invention essentially comprises an antenna securement portion comprised of a cylindrical tube adapted for securement to an antenna of an automobile. The antenna securement portion is molded of polypropylene. The cylindrical tube has a vertical slot therethrough extending inwardly of an interior cylindrical bore thereof. The interior cylindrical bore has a diameter greater than a diameter of the antenna. The cylindrical tube has a length of about thirty inches. The cylindrical tube is of a size whereby when positioned over the antenna a lower end of the tube resting on a portion of the automobile and an upper end of the tube is located immediately beneath an enlargement at an upper end of the antenna for minimizing a chance of inadvertently lifting of the tube from the antenna. The apparatus includes a flag attachment portion comprised of a pair of opposed clips. Each of the clips has an inner portion and an outer portion. Each inner portion has an interior end molded with opposing edges of the vertical slot of the cylindrical tube of the antenna securement portion. Each outer portion is molded with exterior ends of the inner portion and extend angularly therefrom. The flag attachment portion has a length of about one-third of the length of the cylindrical tube of the antenna securement portion. The apparatus includes a flag comprised of a flexible sheet. The flexible sheet has indicia disposed thereon and a periphery. The flexible sheet is removably received between the inner portions of the pair of opposed clips of the flag attachment portion. The flag has a thickness greater than a space defined between the inner portions of the pair of clips.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved apparatus for supporting flags on automobile antennas which has all the advantages of the prior art devices for supporting flags and none of the disadvantages.

It is another object of the present invention to provide a new and improved apparatus for supporting flags on automobile antennas which may be easily and efficiently manufactured and marketed.

It is a further object of the present invention to provide a new and improved apparatus for supporting flags on automobile antennas which is of durable and reliable construction.

An even further object of the present invention is to provide a new and improved apparatus for supporting flags on automobile antennas which is susceptible of a low cost of manufacture with regard to both materials and labor, and which accordingly is then susceptible of low prices of sale to the consuming public, thereby making such an apparatus for supporting flags on automobile antennas economically available to the buying public.

Even still another object of the present invention is to provide a new and improved apparatus for supporting flags on automobile antennas for removably positioning flags over antennas of automobiles.

Lastly, it is an object of the present invention to provide a new and improved apparatus for supporting flags on automobile antennas including an antenna securement portion adapted for securement to an antenna of an automobile. A flag attachment portion is molded with the antenna securement portion. A flag is removably received within the flag attachment portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded front view of the present invention.

FIG. 4 is a cross-sectional view as taken along line 4—4 of FIG. 3.

The same reference numerals refer to the same parts through the various Figures.

DESCRIPTION OF THE PREFERRED EMBODIMENT

Figure 1:
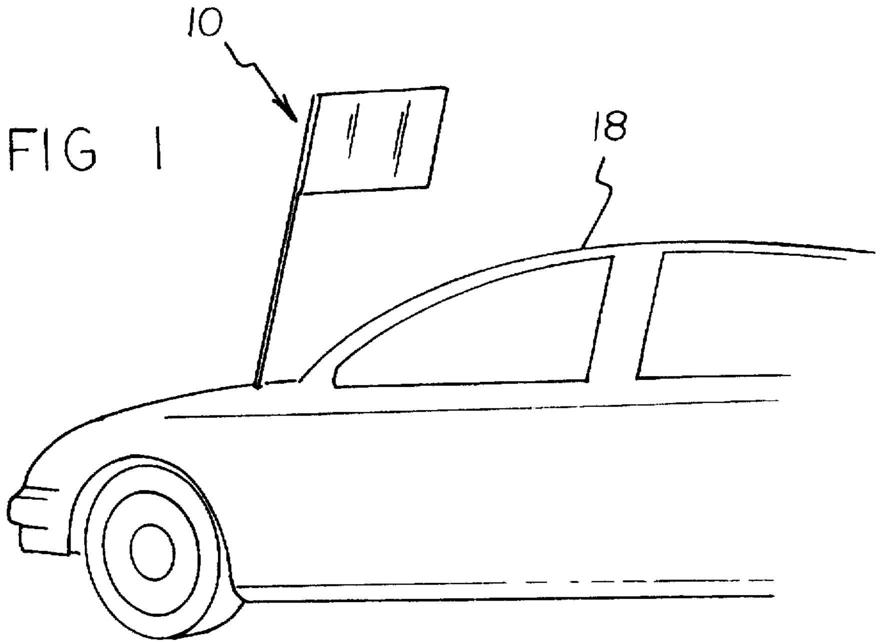
FIG. 1 is a side view of the preferred embodiment of the present invention in place on the antenna of a vehicle.

With reference now to the drawings, and in particular, to FIGS. 1 through 6 thereof, the preferred embodiment of the new and improved apparatus for supporting flags on automobile antennas embodying the principles and concepts of the present invention and generally designated by the reference number 10 will be described.

Specifically, it will be noted in the various Figures that the device relates to a apparatus for supporting flags on automobile antennas for removably positioning flags over antennas of automobiles. In its broadest context, the device consists of an antenna securement portion, a flag attachment portion and a flag. Such components are individually configured and correlated with respect to each other so as to attain the desired objective.

The apparatus 10 includes an antenna securement portion 12 comprised of a cylindrical tube 14 adapted for securement to an antenna 16 of an automobile 18. See FIG. 1. The antenna securement portion is molded of a rigid material. The preferred material is a rigid plastic such as polypropylene, polyethylene, polyvinyl chloride, or the like. Metallic components as of aluminum, steel or the like could likewise be utilized. The cylindrical tube 14 has a vertical slot 20 therethrough extending inwardly of an interior cylindrical bore 22 thereof. The vertical slot 20 allows for the temporary expansion of the cylindrical tube 14 to allow for its coupling with the antenna 16. The interior cylindrical bore 22 has a diameter greater than a diameter of the antenna 16. This feature allows for the coupling of the cylindrical tube 14 to the antenna 16. The cylindrical tube 14 has a length of about thirty inches. These numbers relating to size and dimensions are by example only for the preferred embodiment. Variations are within the purview of the invention. The cylindrical tube 14 is of a size whereby when positioned over the antenna 16, a lower end of the tube 14 rests on a portion of the automobile 18 and an upper end of the tube 14 is located immediately beneath an enlargement 24 at an upper end of the antenna 16 for minimizing a chance of inadvertently lifting of the tube 14 from the antenna 16. The antenna securement portion 12 includes a pair of opposed clips 26. Each of the clips 26 has an inner portion 28 and an outer portion 30. Each inner portion 28 has an interior end molded with opposing edges of the vertical slot 20 of the cylindrical tube 14. Each outer portion 30 is molded with exterior ends of the inner portion 28 and extend angularly therefrom. A user simply pulls apart the cylindrical tube 14 with the outer portions 30 to allow for the coupling with the antenna 16.

Next, the apparatus 10 includes a flag attachment portion 34 comprised of a pair of opposed linear arms 36. The pair of opposed linear arms 36 extend outwardly from the cylindrical tube 14 of the antenna securement portion 12 in a position diametrically opposed from the pair of clips 26. The flag attachment portion 34 has a length of about one-third of the length of the cylindrical tube 14 of the antenna securement portion 12 in the preferred embodiment.

Figure 2:
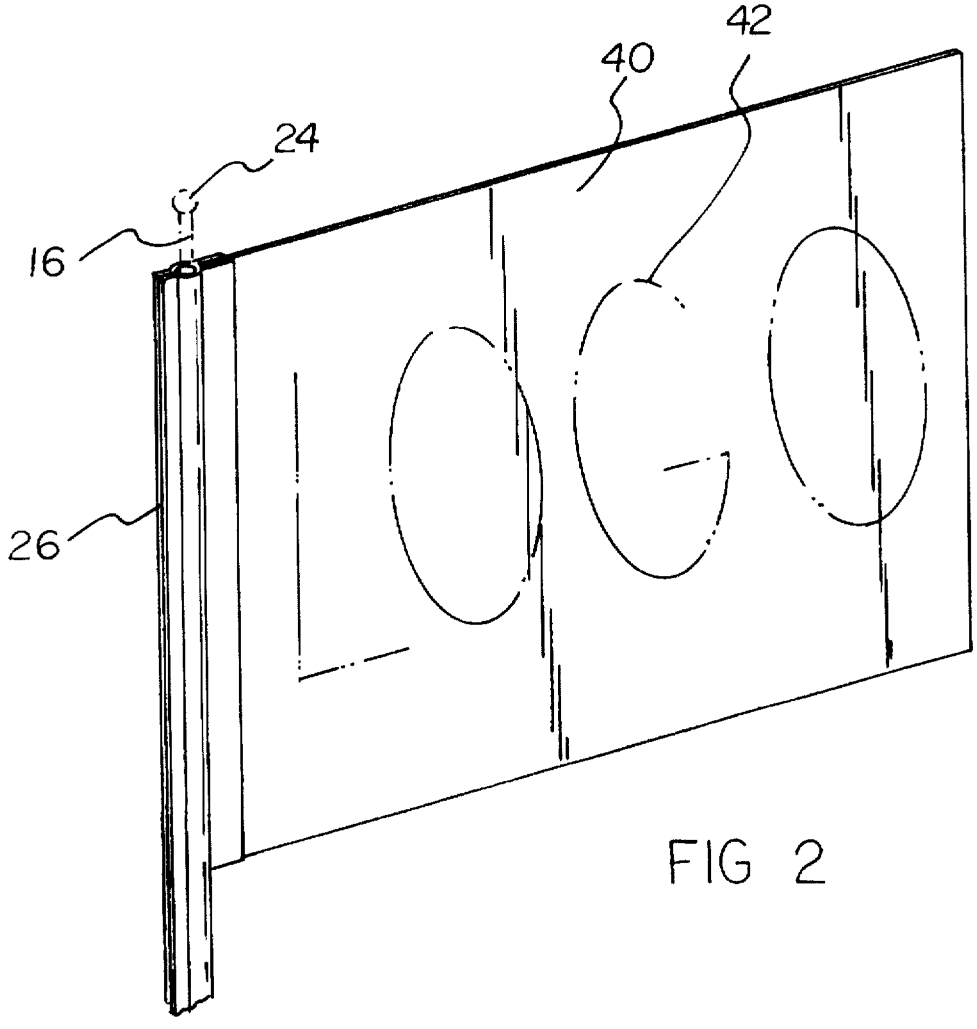
FIG. 2 is a perspective view of the preferred embodiment of the apparatus for supporting flags on automobile antennas constructed in accordance with the principles of the present invention.

Lastly, the apparatus 10 includes a flag 40 comprised of a flexible sheet. The flexible sheet has indicia 42 disposed thereon and a periphery. The flexible sheet is removably received between the pair of opposed linear arms 36 of the flag attachment portion 34. The flag 40 has a thickness greater than a space 44 defined between the pair of opposed linear arms 36 of the flag attachment portion 34. The flag 40 as shown in FIGS. 1–3 is of a generally conventional design having a length slightly greater than the height. The shape of the flag 40 is not of great significance since it could take any of a plurality of conventional shapes such as a banner or a pennant.

Figure 5:
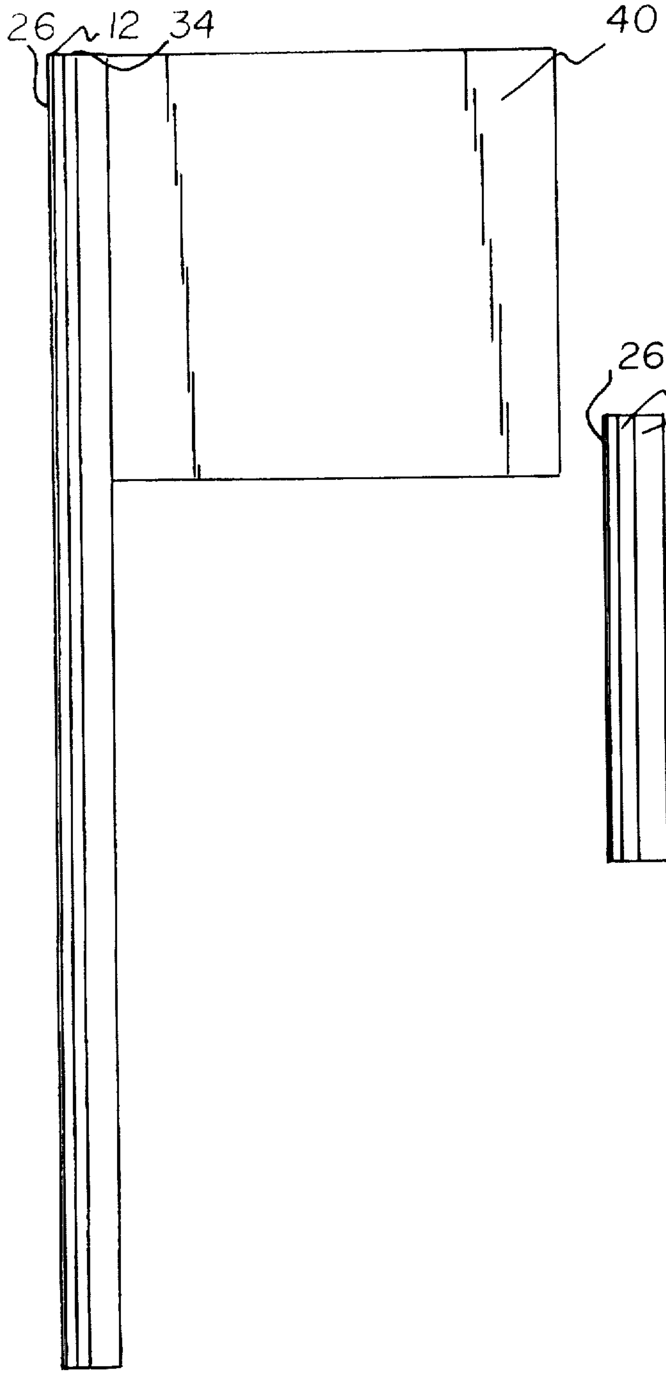
FIG. 5 is a front view of a second embodiment of the present invention.

A second embodiment of the present invention is shown in FIG. 5 and includes substantially all of the components of the present invention wherein the cylindrical tube 14 has a length of about thirty inches and the flag attachment portion 34 has a length of about equal length of the cylindrical tube 14.

Figure 6:
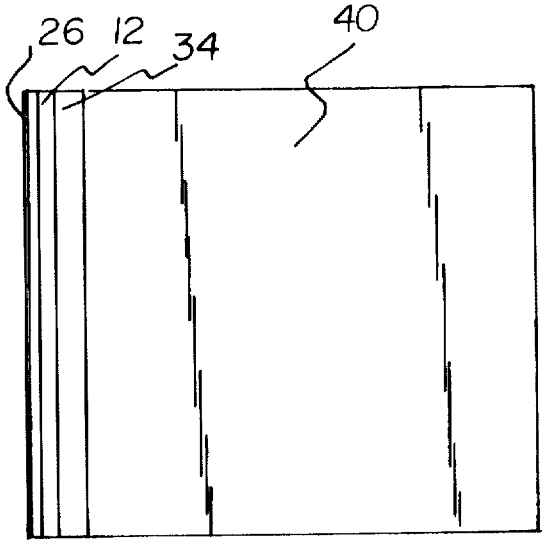
FIG. 6 is a front view of a third embodiment of the present invention.

A third embodiment of the present invention is shown in FIG. 6 and includes substantially all of the components of the present invention wherein the cylindrical tube 14 has a length of about ten inches and the flag attachment portion 34 has a length about equal to the length of the cylindrical tube 14.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An apparatus for supporting flags on automobile antennas for removably positioning flags over antennas of automobiles comprising, in combination:

an antenna securement portion comprised of a cylindrical tube adapted for securement to an antenna of an automobile, the antenna securement portion being molded of polypropylene, the cylindrical tube having a vertical slot therethrough extending inwardly of an interior cylindrical bore thereof, the interior cylindrical bore having a diameter greater than a diameter of the antenna, the cylindrical tube having a length of about thirty inches, the cylindrical tube being of a size whereby when positioned over the antenna a lower end of the tube resting on a portion of the automobile and an upper end of the tube is located immediately beneath an enlargement at an upper end of the antenna for minimizing a chance of inadvertently lifting of the tube from the antenna, the cylindrical tube having a pair of opposed clips, each of the clips having an inner portion and an outer portion, each inner portion having an interior end molded with opposing edges of the vertical slot of the cylindrical tube, each outer portion molded with exterior ends of the inner portion and extending angularly therefrom;

a flag attachment portion comprised of a pair of opposed linear arms extending outwardly from the cylindrical tube of the antenna securement portion in a position diametrically opposed from the pair of clips, the flag attachment portion having a length of about one-third of the length of the cylindrical tube of the antenna securement portion; and a flag comprised of a flexible sheet, the flexible sheet having indicia disposed thereon and a periphery, the flexible sheet removably received between the pair of opposed linear arms of the flag attachment portion, the flag having a thickness greater than a space defined between the pair of opposed linear arms.

2. An apparatus for supporting flags on automobile antennas comprising:

an antenna securement portion adapted for securement to an antenna of an automobile;

a flag attachment portion molded with the antenna securement portion;

a flag removably and slidably received within the flag attachment portion;

wherein the antenna securement portion is comprised of a cylindrical tube having a vertical slot therethrough extending inwardly of an interior cylindrical bore thereof, the interior cylindrical bore having a diameter greater than a diameter of the antenna;

wherein the cylindrical tube is of a size whereby when positioned over the antenna a lower end of the tube resting on a portion of the automobile and an upper end of the tube is located immediately beneath an enlargement at an upper end of the antenna for minimizing a chance of inadvertently lifting of the tube from the antenna;

wherein the flag attachment portion includes a pair of opposed clips;

wherein each of the clips has an inner portion and an outer portion, each inner portion having an interior end molded with opposing edges of the vertical slot of the cylindrical tube, each outer portion molded with exterior ends of the inner portion and extending angularly therefrom;

wherein the flag attachment portion comprises of a pair of opposed linear arms extending outwardly from the cylindrical tube of the antenna securement portion in a position diametrically opposed from the pair of clips;

wherein the flag comprises of a flexible sheet, the flexible sheet having indicia disposed thereon and a periphery, the flexible sheet removably received between the pair of opposed linear arms of the flag attachment portion.

3. The apparatus as set forth in claim 2 wherein the flag having a thickness greater than a space defined between the pair of opposed linear arms.

4. The apparatus as set forth in claim 3 wherein the cylindrical tube having a length of about thirty inches and the flag attachment portion having a length of about one-third of the length of the cylindrical tube.

5. The apparatus as set forth in claim 3 wherein the cylindrical tube having a length of about ten inches and the flag attachment portion having a length about equal to the length of the cylindrical tube.

6. The apparatus as set forth in claim 3 wherein the cylindrical tube having a length of about thirty inches and the flag attachment portion having a length about equal to the length of the cylindrical tube.

7. The apparatus as set forth in claim 3 wherein the antenna securement portion and the flag attachment portion are molded in an elastomeric material.

8. The apparatus as set forth in claim 7 wherein the elastomeric material is polypropylene.

* * * * *